(12) United States Patent
Uhm (10) Patent No.: US 11,306,210 B2
(45) Date of Patent: Apr. 19, 2022

(54) NONSTICK CERAMIC COATING COMPOSITE AND HEATING KITCHEN UTENSIL USING THE SAME

(71) Applicant: SAM KWANG CO., LTD., Busan (KR)

(72) Inventor: Seong Heum Uhm, Busan (KR)

(73) Assignee: SAM KWANG CO., LTD., Busan (KR)

( * ) Notice: Subject to any disclaimer, the term of this patent is extended or adjusted under 35 U.S.C. 154(b) by 239 days.

(21) Appl. No.: 15/505,735

(22) PCT Filed: Jul. 29, 2015

(86) PCT No.: PCT/KR2015/007947
§ 371 (c)(1),
(2) Date: Feb. 22, 2017

(87) PCT Pub. No.: WO2016/047916
PCT Pub. Date: Mar. 31, 2016

(65) Prior Publication Data
US 2018/0215924 A1 Aug. 2, 2018

(30) Foreign Application Priority Data
Sep. 25, 2014 (KR) .................. 10-2014-0128332

(51) Int. Cl.
*C09D 1/02* (2006.01)
*C09D 7/61* (2018.01)
(Continued)

(52) U.S. Cl.
CPC .............. *C09D 1/02* (2013.01); *A47J 36/025* (2013.01); *C09D 1/00* (2013.01); *C09D 7/61* (2018.01);
(Continued)

(58) Field of Classification Search
None
See application file for complete search history.

(56) References Cited

U.S. PATENT DOCUMENTS

2005/0208272 A1* 9/2005 Groll .................. A47J 27/002
428/172
2006/0079620 A1* 4/2006 Greene .............. C09D 183/04
524/430
(Continued)

FOREIGN PATENT DOCUMENTS

JP 08253625 A * 10/1996
KR 10-2005-0072928 A 7/2005
(Continued)

OTHER PUBLICATIONS

English machine translation of KR100895052 (2009).*
(Continued)

*Primary Examiner* — Kenneth J Stachel
(74) *Attorney, Agent, or Firm* — Rabin & Berdo, P.C.

(57) ABSTRACT

A nonstick ceramic coating composite and a heating kitchen utensil using the same, and more particularly, a nonstick ceramic coating composite that is prepared by filing a nonstick silicone fluid in the pores of a functional filler and mixing the filler with an inorganic binding agent, etc. and a heating kitchen utensil that has a nonstick ceramic coating layer using the nonstick ceramic coating composite in order to render heating kitchen utensils nonstick for a long period, according to which it is possible to provide a nonstick ceramic coating composite that is prepared by loading a nonstick silicone fluid in the pores of a functional filler and mixing the filler with an inorganic binding agent, etc., and, by applying the nonstick ceramic coating composite on a heating kitchen utensil, acquire adequate corrosion resistance, wear resistance, heat resistance, etc., prevent food from being sticking to such utensils when being heated and (Continued)

retain the nonstickability of such utensils for a long period by restricting to the extent possible, when compared with conventional nonstick ceramic composites, the nonstickability-endowed compounds from being deteriorated.

2 Claims, 4 Drawing Sheets

(51) Int. Cl.

| | | |
|---|---|---|
| *C09D 7/65* | (2018.01) | |
| *C09D 1/00* | (2006.01) | |
| *A47J 36/02* | (2006.01) | |
| *C08K 3/36* | (2006.01) | |
| *C08K 7/26* | (2006.01) | |
| *C08K 3/22* | (2006.01) | |
| *C08L 83/08* | (2006.01) | |

(52) U.S. Cl.
CPC .................. *C09D 7/65* (2018.01); *C08K 3/36* (2013.01); *C08K 7/26* (2013.01); *C08K 2003/2227* (2013.01); *C08K 2003/2244* (2013.01); *C08L 83/08* (2013.01)

(56) References Cited

U.S. PATENT DOCUMENTS

2009/0162592 A1\* 6/2009 Baikerikar ............. C03C 17/30
428/38
2010/0181322 A1 7/2010 Perillon et al.

FOREIGN PATENT DOCUMENTS

| KR | 20050072928 A | * | 7/2005 |
|---|---|---|---|
| KR | 10-0895052 B1 | | 4/2009 |
| KR | 100895052 B1 | * | 4/2009 |
| KR | 10-2011-0101865 A | | 9/2011 |
| KR | 10-2012-0073507 A | | 7/2012 |
| KR | 10-1400911 B1 | | 6/2014 |

OTHER PUBLICATIONS

English machine translation of JP08-253625(1996).\*
English abstract KR100895052B1 (2009).\*
SciFinder Acc No. 1998_277275 (1998).\*
SciFinder CAS Reg No. 508178-37-8 (2019).\*
English machine translation KR20050072928 (2005).\*
CAS RN 14832-91-8 Amethyst (2020).\*

\* cited by examiner

| Test Method | Comparative Example 1 | Working Example 1 |
|---|---|---|
| Restoration Test after Salt Water Boil Test |  |  |
| Restoration Test after Distilled Water Boil Test |  |  |

FIG. 5

NONSTICK CERAMIC COATING COMPOSITE AND HEATING KITCHEN UTENSIL USING THE SAME

TECHNICAL FIELD

The present disclosure relates to a nonstick ceramic coating composite and a heating kitchen utensil using the same, and more particularly, a nonstick ceramic coating composite that is prepared by filing a nonstick silicone fluid in the pores of a functional filler and mixing the filler with an inorganic binding agent, etc. and a heating kitchen utensil that has a nonstick ceramic coating layer using the nonstick ceramic coating composite in order to render heating kitchen utensils nonstick for a long period.

BACKGROUND

Figure 1:
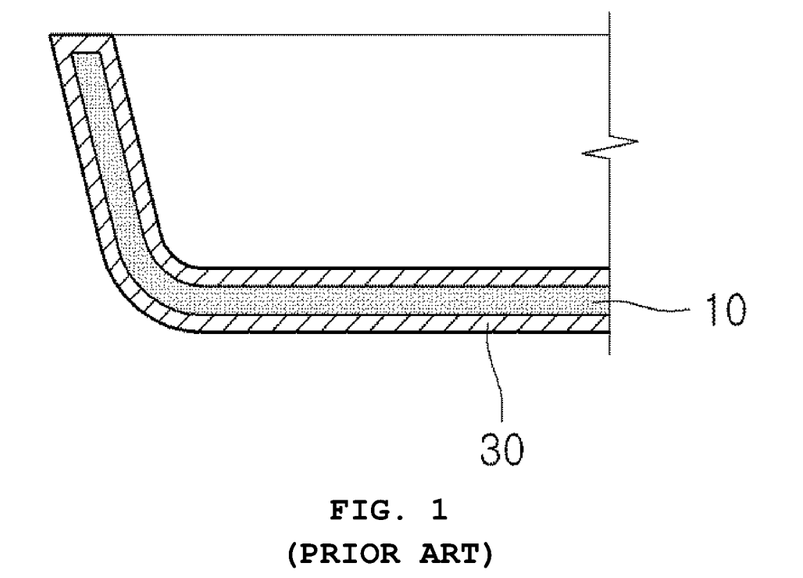
FIG. 1 is a cross-sectional view of a conventional heating kitchen utensil that has a ceramic coating layer.

The body of a heating kitchen utensils such as frying pans, saucepans, etc. is made of bare metal, or the metallic body 10 is, as illustrated in FIG. 1, coated with a ceramic coating layer 30 to be endowed with acid resistance, wear resistance, durability, heat resistance, corrosion resistance, etc. However, such kitchen utensils thus manufactured may, when they are used for cooking by means of heat, be up against food that sticks to or burns on the cooking surface.

Figure 2:
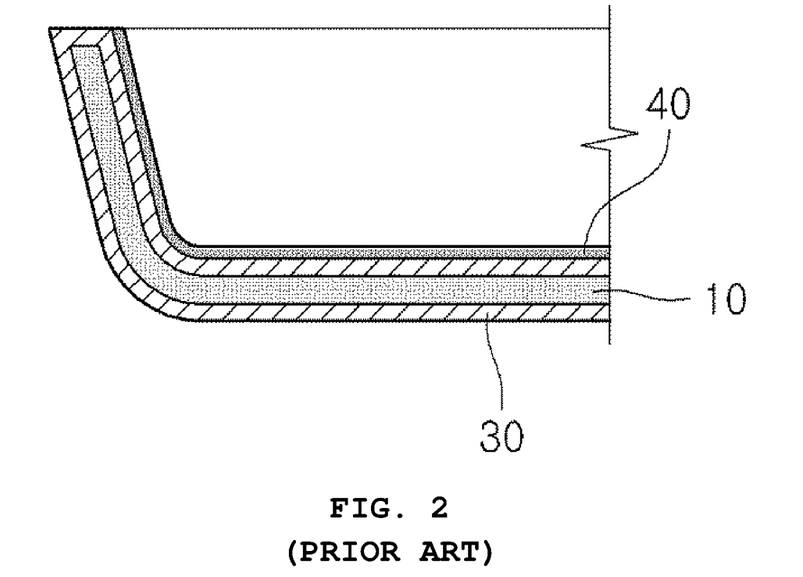
FIG. 2 is a cross-sectional view of a conventional heating kitchen utensil that has a nonstick ceramic coating layer.

To resolve such drawbacks, there have been provided, among others, a heating kitchen utensil, as provided in Patent Document 1, as illustrated in FIG. 2, wherein a bottomcoat of a ceramic coating layer 30 is coated on the internal and external surface of the body 10 and a topcoat of a nonstick ceramic coating layer 40 that includes a silane compound is coated on the external surface of the ceramic coating layer 30 built as the bottomcoat on the internal cooking surface; a coating layer on kitchen utensils, home appliances, etc., as provided in Patent Document 2, using an inorganic ceramic coating composite that consists of an inorganic solvent, functional additive, silicone oil polymer, pigment, etc. being endowed with nonstickability and cleaning readiness reinforced; and an antistick coating, as provided in Patent Document 3, that is made of a sol-gel material including one or more polyalkoxylated metallic matrices, one or more colloidal metal oxides that are 5 wt % or more of the gross weight of the coating 2 and dispersed in the matrices and one or more silicone oils, assumes the shape of a membrane continuum with a thickness of 10 μm or more and has ameliorated hydrophobicity and heat resistance.

Figure 3:
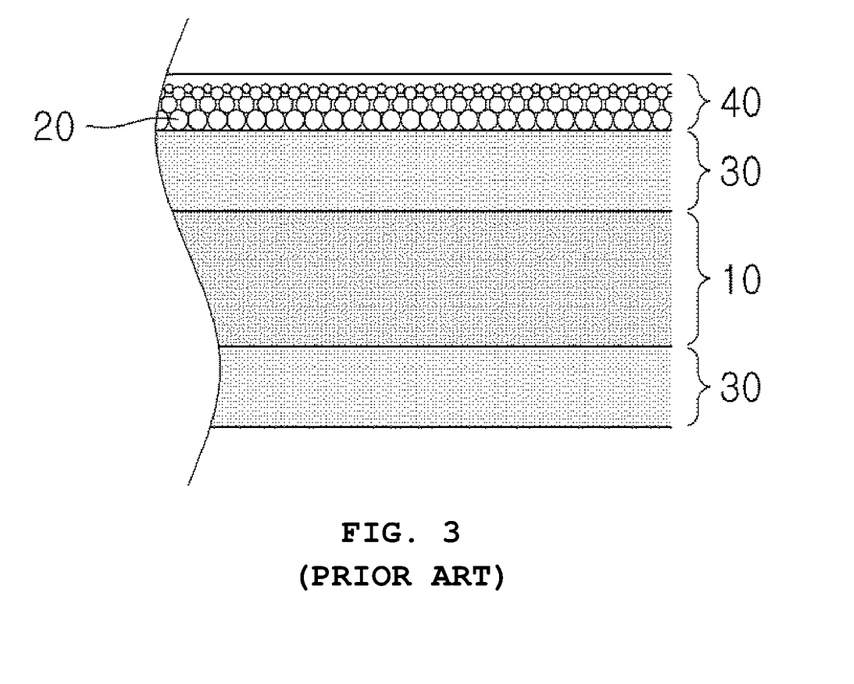
FIG. 3 is a cross-sectional view of the nonstick ceramic coating layer of the heating kitchen utensil as illustrated in FIG. 2.

As for those nonstick coating agent composites disclosed in Patent Documents 1 through 3, a ceramic coating layer 30 as a bottomcoat is applied in general, as illustrated in FIGS. 2 and 3, on the external surface of a metallic body 10 and a nonstick coating layer as a topcoat 40 is applied on the external surface of the ceramic coating layer 30 on the cooking surface. Those composites that constitute the nonstick coating layers 40 are in common prepared by mixing a silane compound or silicone oil, etc. with a functional filler and, when being applied on heating kitchen utensils and heated for a certain period, fail to retain their nonstickability for a long time because, as illustrated in FIG. 3, the filler 20 that has a specific gravity that is higher than those inherited in the silane compounds or silicone oils tend, when the film is built, to sediment on the bottom of the nonstick coating layer 40 whereas the silane compounds and silicone oils, which are nonstick, suspend in the top part of the nonstick coating layer 40.

In order to resolve those problems inherited in the nonstick coating agent composites as described thus far, the present disclosure provides a nonstick ceramic coating composite using a functional filler by substituting the functional filler of the inorganic ceramic coating composite referred to in Patent Document 4 the patent of which was filed by the applicant of the present disclosure and thus registered with a porous filler and loading a nonstick silicone fluid in the pores of the filler.

SUMMARY OF INVENTION

Technical Problem

The present disclosure provides a nonstick ceramic coating composite and a heating kitchen utensil using the same, and more particularly, a nonstick ceramic coating composite that is prepared by filing a nonstick silicone fluid in the pores of a functional filler and mixing the filler with an inorganic binding agent, etc. and a heating kitchen utensil that has a nonstick ceramic coating layer using the nonstick ceramic coating composite in order to render heating kitchen utensils nonstick for a long period.

More specifically, unlike those nonstick ceramic composites disclosed in conventional art in which the silane compounds or silicone oils that provide the nonstickability are separated from the filler 20 and suspended over the filler 20 as illustrated in FIG. 3 while the film of the nonstick coating layer 40 gets dried, the present disclosure prepares a nonstick ceramic composite using a functional filler into the pores of which a silicone fluid is loaded in order to bring about nonstickability and restricts to the extent possible, when compared with conventional nonstick ceramic composites, the nonstickability-endowed compounds from being deteriorated while the heating kitchen utensils are heated.

In this regard, the present disclosure renders the functional filler with a silicon fluid loaded in the pores thereof dispersed evenly across the bottom, middle and top parts of the nonstick coating layer 40 so that the nonstick materials sedimented in the bottom part of the nonstick coating layer 40 gradually diffuse towards the coated surface, thereby retaining the nonstickability for a long period even when being exposed to a pyrogenic environment.

Solution to Problem

The present disclosure provides a nonstick ceramic coating composite that may include an inorganic binding agent, a functional filler, ceramic powder and a pigment, the composite containing, with respect to 100 parts by weight of the inorganic binding agent, 7 to 12 parts by weight of the functional filler, 15 to 20 parts by weight of the ceramic powder, and 1 to 16 parts by weight of the pigment.

The present disclosure also provides a heating kitchen utensil with the nonstick ceramic coating composite coated on the cooking surface thereof.

The inorganic binding agent may contain 30 to 50 wt % of a silane compound and 50 to 70 wt % of an inorganic binder, wherein the inorganic binder may be a mixture of one or more of silica sol, alumina sol and zirconia sol.

A silicone fluid may be loaded by 40 to 60 wt % in 40 to 60 wt % of the functional filler.

The silane compound may be one or more species of silane compounds that have a chemical formula of $R_nSiX_{4-n}$, where Xs as a hydrolysable group or hydroxyl group are equal to or different from each other, radical Rs as an alkyl group the hydrogen number and carbon number of which is less than 10 and n is 0, 1 or 2.

The silicon fluid may be selected as one or more species from methylphenyl silicone fluid, alkylaryl silicone fluid, hydrogen silicone fluid, amino silicone fluid, fluorosilicone fluid and hydroxyl silicone fluid.

Advantageous Effects of Invention

According to the present disclosure, it is possible to provide a nonstick ceramic coating composite that is prepared by loading a nonstick silicone fluid in the pores of a functional filler and mixing the filler with an inorganic binding agent, etc., and, by applying the nonstick ceramic coating composite on a heating kitchen utensil, acquire adequate corrosion resistance, wear resistance, heat resistance, etc., prevent food from being sticking to such utensils when being heated and retain the nonstickability of such utensils for a long period by restricting to the extent possible, when compared with conventional nonstick ceramic composites, the nonstickability-endowed compounds from being deteriorated.

DESCRIPTION OF EMBODIMENTS

The present disclosure for achieving said effects relates to a nonstick ceramic composite and a heating kitchen utensil using the same and only those matters that are necessary for understanding the technical features of the present disclosure are described more specifically below with the rest omitted not to detract from the subject matters of the present disclosure.

The nonstick ceramic coating composite according to the present disclosure may fall under Patent Document 4, INORGANIC CERAMIC COATING AGENT COMPOSITE (Korean Patent Registration No. 10-0895052) previously filed by the applicant of the present disclosure then thus registered and, more specifically, the nonstick ceramic coating composite that may include an inorganic binding agent, functional filler, ceramic powder and pigment may contain, with respect to 100 parts by weight of the inorganic binding agent, 7 to 12 parts by weight of the functional filler, 15 to 20 parts by weight of the ceramic powder, and 1 to 16 parts by weight of the pigment.

The inorganic binding agent according to the present disclosure is added in order to ameliorate the coated film in terms of the mechanical properties such as durability and wear resistance, chemical properties such as corrosion resistance and heat conductivity and may contain 30 to 50 wt % of a silane compound and 50 to 70 wt % of an inorganic binder, wherein the inorganic binder may be a mixture of one or more of silica sol, alumina sol and zirconia sol.

The silane compound reacts chemically with and are bonded to the inorganic binder, where the bond strength between the silane compound and inorganic binder may, when the content of the silane compound to mix deviates from the range, be lowered at a high temperature, thereby resulting in detachment.

Preferably, the silane compound may be silanes the chemical formula of which is $R_nSiX_{4-n}$ or oligomers that are derived from the silanes.

The silane compound may be one or more species of silane compounds that have a chemical formula of $R_nSiX_{4-n}$, where Xs as a hydrolysable group or hydroxyl group are equal to or different from each other, radical Rs as an alkyl group the hydrogen number and carbon number of which is less than 10 and n is 0, 1 or 2.

More specifically, the silane compound may be required to be selected as one or more species from methyltrimethoxysilane, ethyltrimethoxysilane, normal propyltrimethoxysilane, phenyltrimethoxysilane, vinyltrimethoxysilane, methyltriethoxysilane, ethyltriethoxysilane, normal propyltriethoxysilane, phenyltriethoxysilane, vinyltriethoxysilane, trifluoropropyltrimethoxysilane, tridecafluorooctyltrimethoxysilane, tetraethoxysilane and heptadecafluorodecyltrimethoxysilane.

The silica sol is produced when amorphous silica particulates form colloidal particulates and react chemically with the silane compound, where the bond strength of the silane compound may be reduced, thereby resulting in lowering the physical properties when the content of the silica sol to mix deviates from the range.

Preferably, the silica sol may be prepared by mixing 20 to 40 wt % of silicon dioxide ($SiO_2$) powder the diameter of which ranges from 0.2 to 1.0 μm with 60 to 80 wt % of water as a dispersion medium, where the silica sol may be not appropriately form when the content of the silicon dioxide and water deviates from their range, respectively.

The alumina sol is added to ameliorate the coated film in terms of the mechanical properties such as surface hardness, wear resistance and durability and chemical properties such as alkali resistance and corrosion resistance because it shows a high sintering density at a lower temperature, where the physical and chemical properties of the coated film may be deteriorated when the content of the alumina sol to mix goes down below 15 wt % lowering the sintering density whereas the coated film surface may deform when the content of the alumina sol to mix goes up over 20 wt % although the physical and chemical properties can be improved because the sintering density of the coated film increases.

Preferably, the alumina sol may be prepared by mixing 10 to 20 wt % of alumina oxide ($Al_2O_3$) powder the diameter of which ranges from 0.2 to 1.0 μm with 80 to 90 wt % of water as a dispersion medium, where the alumina sol may be not appropriately form when the content of the aluminum oxide and water deviates from their range, respectively.

The zirconia sol is added to ameliorate the coated film in terms of the physical properties such as heat resistance and corrosion resistance because it shows, when being sintered, a high strength and hardness, thereby enduring well temperature change, where the physical properties may be deteriorated due to decrease in strength and hardness when the content of the zirconia sol to mix goes down below 15 wt % whereas the coated film may become vulnerable to impact when the content of the zirconia sol to mix goes up over 20 wt % although the physical properties such as strength and hardness can be improved.

Preferably, the zirconia sol may be prepared by mixing 10 to 20 wt % of zirconia ($ZrO_2$) powder the diameter of which ranges from 0.2 to 1.0 μm with 80 to 90 wt % of water as a dispersion media, where the zirconia sol may be not appropriately form when the content of the zirconia and water deviates from their range, respectively.

The functional filler according to this disclosure refers to a filler that is porous or has a high specific surface area into the pores of which a nonstick silicone fluid is contained. A nonstick coating layer that is prepared by mixing the functional filler and a nonstick ceramic coating composite and applied to a heating kitchen utensil keeps food from sticking on the cooking surface of the utensil when being heated and renders the utensil nonstick for a long period.

In this regard, the present disclosure renders the functional filler with a silicon fluid loaded in the pores thereof dispersed evenly across the bottom, middle and top parts of the nonstick coating layer 40 so that the nonstick materials sedimented in the bottom part of the nonstick coating layer 40 gradually diffuse towards the coated surface, thereby retaining the nonstickability for a long period even when being exposed to a pyrogenic environment.

According to the present disclosure, preferably 7 to 12 parts by weight of the functional filler may be mixed with, and in proportion to 100 parts by weight of the inorganic binding agent, where the nonstickability of the heating kitchen utensil may be deteriorated when the content of the functional filler to mix with the inorganic binding agent is less than the range whereas, when the content is more than the range, the properties such as corrosion resistance, wear resistance, heat resistance, etc. of the heating kitchen utensil may be deteriorated as the relative content of other constituents including the inorganic binding agent, ceramic powder, etc. becomes less than that of the functional filler.

The functional filler that is a porous material according to the present disclosure may be selected as one of zeolite, illite, sepiolite, bentonite, fumed silica, aerosol silica and charcoal or be a mixture thereof.

Preferably, the silicone fluid may be loaded by 40 to 60 wt % in 40 to 60 wt % of the functional filler, where the nonstickability of the heating kitchen utensil may be deteriorated when the content of the silicone fluid to be loaded in the functional filler is less than the range whereas, when being more than the range, the adhesion of the nonstick ceramic coating layer may decrease as the silicone fluid loaded in the functional filler leaks off the pores of the functional filler to a large quantity.

As for the silicone fluid to load in the functional filler according to the present disclosure may preferably selected as one or more species from methylphenyl silicone fluid, alkylaryl silicone fluid, hydrogen silicone fluid, amino silicone fluid, fluorosilicone fluid and hydroxyl silicone fluid.

The ceramic powder according to the present disclosure is added in order to ameliorate the mechanical properties of the coated film and emit far infrared rays as well as negative ions, where the far infrared rays and negative ions may not be emitted effectively when the content of the ceramic powder to mix is less than 15 parts by weight whereas the coated film may deform while the adhesion thereof may decrease when the content of the ceramic powder is more than 20 parts by weight Preferably, considering the quantity of the negative ions and far infrared rays, a negative ion source and far infrared ray source may be required to be mixed to 1:1 by weight, where the far infrared ray source may preferably be selected as one or more species from those natural minerals the far infrared ray emission rate of which is 90% or more at 40° C. such as quartz, monzonite, gneisses, and rhyolitic tuff whereas the negative ions source may preferably be selected as one or more species from natural rare earth rocks such as strontium, vanadium, zirconium, cerium, neodymium, lanthanum, barium, rubidium, caesium and gallium.

In addition, a pigment is added to the inorganic ceramic coating composite for chromogenic development in the coating layer, where the content of the pigment to mix may be specified to 1 to 16 parts by weight as to 100 parts by weight of the inorganic binding agent but not limited thereto, being appropriately adjusted according to the color of the pigment, demand of a customer, need of a manufacturer or saturation, brightness, etc. of the pigment while the species of the pigment is not specially specified but selected from typical ones.

According to the present disclosure, it is possible to provide, by building a nonstick ceramic coating layer on a heating kitchen utensil using the ceramic coating composite based on the technical thoughts thus far described, a nonstick ceramic coating composite that is prepared by loading a nonstick silicone fluid in the pores of a functional filler and mixing the filler with an inorganic binding agent, etc., and, by applying the nonstick ceramic coating composite on a heating kitchen utensil, acquire adequate corrosion resistance, wear resistance, heat resistance, etc., prevent food from being sticking to such utensils when being heated and retain the nonstickability of such utensils for a long period by restricting to the extent possible, when compared with conventional nonstick ceramic composites, the nonstickability-endowed compounds from being deteriorated.

The present disclosure is described more specifically below based on exemplary embodiments while the present disclosure must not be limited thereto.

1. Preparation of the Nonstick Ceramic Coating Composite

Preparation Example 1

A nonstick ceramic coating composite was prepared by mixing 7 parts by weight of a functional filler, 15 parts by weight of ceramic powder and 5 parts by weight of a black pigment with respect to 100 parts by weight of the inorganic binding agent.

The inorganic binding agent used for the nonstick ceramic coating composite provide in Preparation Example 1 consisted of 30 wt % of a silane compound that is methyltrimethoxysilane and 70 wt % of silica sol while the functional filler consisted of 60 wt % of fumed silica and 40 wt % of methylphenylsilicone fluid loaded in the fumed silica.

The silica sol consisted of 30 wt % of silicon dioxide the diameter of which was 0.2 to 1.0 μm and 70 wt % of water. Potassium titanate and alumina was mixed by 1:1 to form the functional filler while quartz and monzonite as the far infrared ray emitting source and strontium and vanadium as the negative ion emission source were mixed by an identical quantity to form the ceramic powder.

Preparation Example 2

A nonstick ceramic coating composite was prepared by mixing 12 parts by weight of a functional filler, 20 parts by weight of ceramic powder and 10 parts by weight of a black pigment with respect to 100 parts by weight of the inorganic binding agent.

The inorganic binding agent used for the nonstick ceramic coating composite provided in Preparation Example 2 consisted of 40 wt % of a silane compound that is ethyltrimethoxysilane, 30 wt % of silica sol and 30 wt % of alumina sol while the functional filler consisted of 40 wt % of fumed silica and 60 wt % of methylphenylsilicone fluid loaded in the fumed silica.

The silica sol consisted of 30 wt % of silicon dioxide the diameter of which was 0.2 to 1.0 μm and 70 wt % of water while the alumina sol consisted of 20 wt % of aluminum oxide the diameter of which was 0.2 to 1.0 μm and 80 wt % of water. Potassium titanate and alumina was mixed by 1:1 to form the functional filler while quartz and monzonite as the far infrared ray emitting source and strontium and vanadium as the negative ion emission source were mixed by an equivalent quantity to form the ceramic powder.

Preparation Example 3

A nonstick ceramic coating composite prepared by mixing 12 parts by weight of a functional filler, 15 parts by weight of ceramic powder and 16 parts by weight of a black pigment with respect to 100 parts by weight of the inorganic binding agent was coated on an aluminum plate according to the same method used in said embodiment.

The inorganic binding agent used for the nonstick ceramic coating composite provided in Preparation Example 3 consisted of 50 wt % of a silane compound that is methyltrimethoxysilane, 25 wt % of silica sol and 25 wt % of zirconia sol.

The silica sol consisted of 30 wt % of silicon dioxide the diameter of which was 0.2 to 1.0 μm and 70 wt % of water while the zirconia sol consisted of 20 wt % of zirconia the diameter of which is 0.2 to 1.0 μm and 80 wt % of water. Potassium titanate and alumina was mixed by 1:1 to form the functional filler while quartz and monzonite as the far infrared ray emitting source and strontium and vanadium as the negative ion emission source were mixed by an equivalent quantity to form the ceramic powder.

2. Application of the Nonstick Ceramic Coating Layer on a Heating Kitchen Utensil (Such as Frying Pans)

Working Example 1

The nonstick ceramic coating composite prepared by the method provided in Preparation Example 1 was topcoated by a thickness of 60 μm on the internal surface of a heating kitchen utensil (frying pan) made of die cast aluminum on which a ceramic coating layer had been already applied. The specimen was heated at 270° C. for 15 minutes to harden the nonstick ceramic coating layer.

Working Example 2

The nonstick ceramic coating composite prepared by the method provided in Preparation Example 2 was topcoated by a thickness of 60 μm on the internal surface of a heating kitchen utensil (frying pan) made of die cast aluminum on which a ceramic coating layer had been already applied. The specimen was heated at 270° C. for 15 minutes to harden the nonstick ceramic coating layer Comparative Example 1

The nonstick ceramic coating composite prepared by the method provided in Preparation Example 3 was topcoated by a thickness of 60 μm on the internal surface of a heating kitchen utensil (frying pan) made of die cast aluminum on which a ceramic coating layer had been already applied. The specimen was heated at 270° C. for 15 minutes to harden the nonstick ceramic coating layer.

3. Characterization of Nonstickability of the Heating Kitchen Utensil (Such as Frying Pans)

Nonstickability of the heating kitchen utensils (frying pans) prepared by Working Examples 1 and 2 and Comparative Example 1 was characterized according to the Egg Test CMA 22.2.1(2012) in terms of the following items, the results of which are listed in Table 1.
(1) Thermal Shock Test at 400° C. (Modified CMA)

The heating kitchen utensil (frying pan) was maintained for 1 hour in an oven preheated to 400° C. then slowly cooled at room temperature. The utensil was completely cleansed and its nonstickabilty was evaluated according to the egg test method. Evaluation was repeated until the nonstickability was eliminated.
(2) Salt Water Boil Test (Modified CMA)

The heating kitchen utensil (frying pan) that contained in its inside 1 L of 5% salt water was placed on a hot plate. After boiling the salt water for 3 hours the utensil was completely cleansed and its nonstickability was evaluated according to the egg test method. Evaluation was repeated until the nonstickabilty was eliminated.
(3) Distilled Water Boil Test (Modified CMA)

The heating kitchen utensil (frying pan) that contained in its inside 1 L of distilled water was placed on a hot plate. After boiling the distilled water for 2 hours the utensil was completely cleansed and its nonstickability was evaluated according to the egg test method. Evaluation was repeated until the nonstickabilty was eliminated

TABLE 1

[unit: NS]

| Test Method | Working Example 1 | Working Example 2 | Comparative Example 1 |
|---|---|---|---|
| Thermal Shock Test at 400° C. | 3.0 after 6 tests<br>1.0 after 7 tests | 3.0 after 6 tests<br>1.0 after 7 tests | 1.0 after 3 tests |
| Salt Water Boil Test | 3.0 after 12 hours<br>1.0 after 15 hours | 3.0 after 12 hours<br>1.0 after 15 hours | 1.0 after 6 hours |
| Distilled Water Boil Test | 4.0 after 10 hours<br>3.0 after 14 hours<br>1.0 after 16 hours | 4.0 after 10 hours<br>3.0 after 14 hours<br>1.0 after 16 hours | 1.0 after 10 hours |

Egg Test CMA (Cookware Manufactures Association) 22.2.1(2012): Heat a pan on an electric hot plate. When the surface temperature of the pan reaches 150° C., lay down the content of an egg without cooking oil on the surface for cooking for 2 minutes. Repeat 5 times under an identical condition. Evaluate the degree to which the egg sticks on the pan surface. Give 5 to complete removal of the egg; 4 to a slight residue, 1 cm² or so, of the egg that sticks; 3 to an egg residue of 3 to 4 cm² that sticks; 2 to a situation where about a half of the egg sticks and a certain degree of force should be applied to overturn it; and 1 to a residue that is ¾ or more of the egg and persists.
NS denotes nonstick. It refers to a situation where food that is in cooking doesn't stick to the cooking utensil.
Thermal Shock Test at 400° C.: "3.0 after 6 tests" refers to a situation where a process that a heating kitchen utensil such as frying pans is placed in an oven preheated to 400° C., kept for 1 hours and slowly cooled at room temperature is repeatedly implemented 5 times and the NS value of the egg test is recorded at 3.0.
Salt water boil test: "3.0 after 12 hours" refers to a situation where a heating kitchen utensil such as frying pans that contains 1 L of salt water in its inside is placed on an oven, the salt water is boiled for 12 hours and the NS value of the egg test is recorded at 3.0.
Distilled water boil test: "4.0 after 10 hours" refers to a situation where a heating kitchen utensil such as frying pans that contains 1 L of distilled water in its inside is placed on an oven, the distilled water is boiled for 10 hours and the NS value of the egg test is recorded at 4.0.

As listed in Table 1, nonstickability was higher in Working Examples 1 and 2 than that in Comparative Example 1 while the time took to eliminate the nonstickability was also longer in Working Examples 1 and 2 than that in Comparative Example 1.

Figure 4:
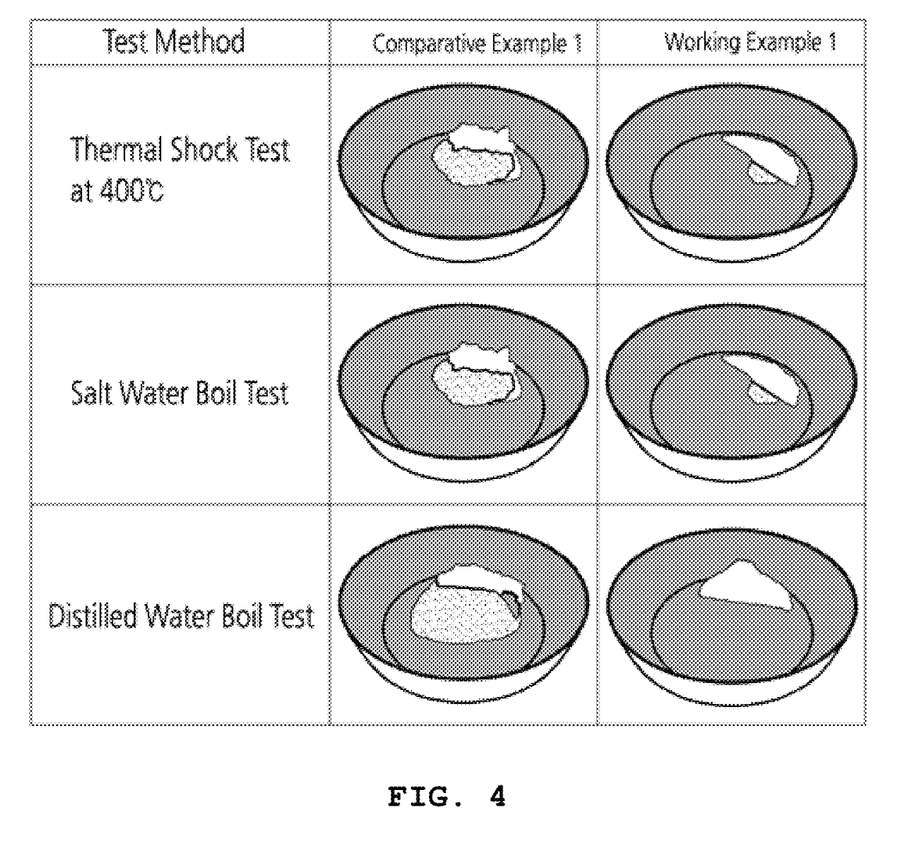
FIG. 4 illustrates the results from nonstick-testing a nonstick ceramic coating layer applied to a heating kitchen utensil according to an embodiment of the present disclosure.

Just for information, FIG. 4 illustrates the results of the test items listed in Table 1 on Working Example 1 and Comparative Example 1 implemented according to Egg Test CMA 22.2.1(2012) for the purpose of evaluating the non-stickabilty of a heating kitchen utensil such as frying pans manufactured according to an embodiment of the present disclosure.

3. Characterization of Nonstickability Restoration of the Heating Kitchen Utensil (Such as Frying Pans)

After repeatedly tested as listed in Table 1 until its nonstickability was eliminated (NS=1.0), the heating kitchen utensil (frying pan) with its nonstickability thus lost was heat-treated at 300° C. for 3 hours and eggs were used to evaluate the degree to which the utensil restore its nonstickability against Salt Water Boil and Distilled Water Boil tests, the results being listed in Table 2.

TABLE 2

[unit: NS]

| Test Method | Working Example 1 | Working Example 2 | Comparative Example 1 |
|---|---|---|---|
| Salt Water Boil Test | 4.0 | 4.0 | 1.0 |
| Distilled Water Boil Test | 3.0 | 3.0 | 1.0 |

Figure 5:
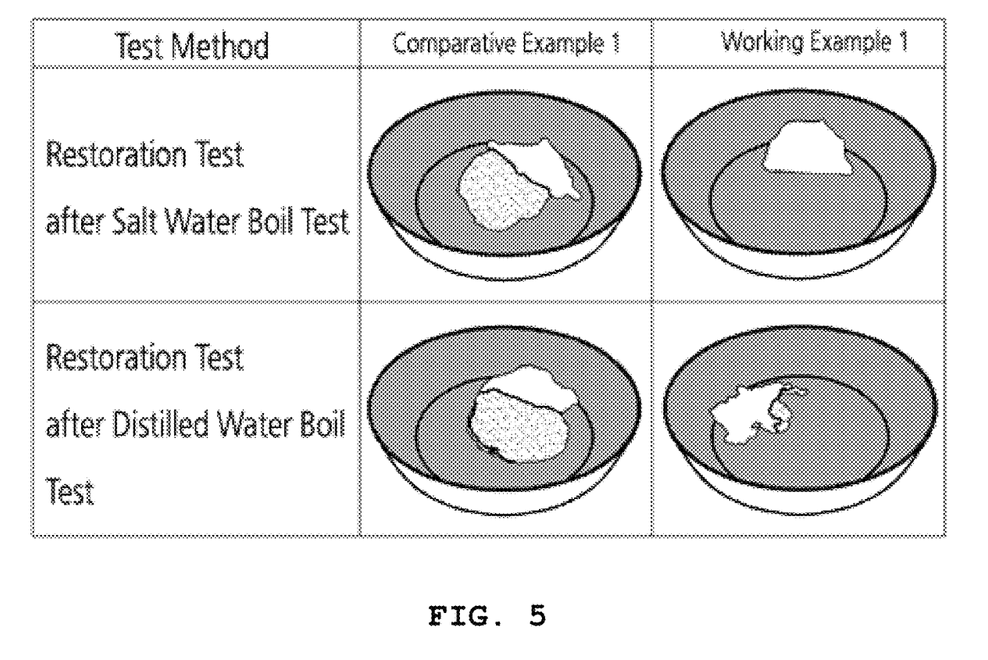
FIG. 5 illustrates the results from restoration-testing, after nonstick-testing, a nonstick ceramic coating layer applied to a heating kitchen utensil according to an embodiment of the present disclosure.

As listed in Table 2, nonstickability was higher in Working Examples 1 and 2 than that in Comparative Example 1 whereas the nonstickability was not restored in Comparative Example 1. Just for information, FIG. 5 illustrates the results of the test items listed in Table 2 on Working Example 1 and Comparative Example 1 implemented according to Egg Test CMA 22.2.1(2012) for the purpose of evaluating the non-stickabilty restoration of a heating kitchen utensil such as frying pans manufactured according to an embodiment of the present disclosure.

The nonstick ceramic coating composite and heating kitchen utensil coated with the same according to the present disclosure has been thus far described based on the preferred embodiments. A person skilled in the art will understand that such embodiments described thus far are nothing more than exemplary and may be modified and adjusted in various ways but within the scope that must not deviate from the technical thoughts of the present disclosure.

INDUSTRIAL APPLICABILITY

The nonstick ceramic coating composite provided by the present disclosure may include 7 to 12 parts by weight of the functional filler, 15 to 20 parts by weight of the ceramic powder, and 1 to 16 parts by weight of the pigment with respect to 100 parts by weight of the inorganic binding agent, while the nonstick ceramic composite may be effective as a coating agent for cookware in that it may be coated on a heating kitchen utensil in order to acquire corrosion resistance, wear resistance, heat resistance, etc., resolve the problem of food that sticks on the cooking surface when being heated and restrict to the extent possible, when compared with conventional nonstick ceramic composites, the nonstickability-endowed compounds from being deteriorated.

What is claimed is:

1. A nonstick ceramic coating composite for a heating kitchen utensil consisting of:
    an inorganic binding agent consisting of 30 wt % of a silane compound and 70 wt % of an inorganic binder;
    a functional filler consisting of 60 wt % of a porous material having pores and 40 wt % of a silicone fluid, wherein the pores of the porous material are filled with the silicone fluid;
    ceramic powder; and
    a pigment,
    wherein the silane compound is methyltrimethoxysilane,
    wherein the inorganic binder is silica sol consisting of 30 wt % of silicon dioxide having a diameter of 0.2 to 1.0 μm and 70 wt % of water,
    wherein the porous material is fumed silica,
    wherein the silicone fluid is methylphenyl silicone fluid,
    wherein the ceramic power is consisted of quartz, monzonite, strontium, and vanadium,
    wherein, with respect to 100 parts by weight of the inorganic binding agent, the nonstick ceramic coating composite consists of
        7 parts by weight of the functional filler,
        15 parts by weight of the ceramic powder, and
        5 parts by weight of the pigment.

2. A nonstick ceramic coating composite for a heating kitchen utensil consisting of:
    an inorganic binding agent consisting of 40 wt % of a silane compound and 60 wt % of an inorganic binder;
    a functional filler consisting of 40 wt % of a porous material having pores and 60 wt % of a silicone fluid, wherein the pores of the porous material are filled with the silicone fluid;
    ceramic powder; and
    a pigment,
    wherein the silane compound is ethyltrimethoxysilane,
    wherein the inorganic binder is consisted of 30 wt % of silica sol and 30 wt % of alumina sol, the silica sol consisting of 30 wt % of silicon dioxide having a diameter of 0.2 to 1.0 μm and 70 wt % of water and the alumina sol consisting of 20 wt % of aluminum oxide having a diameter of 0.2 to 1.0 μm and 80 wt % of water,
    wherein the porous material is fumed silica,
    wherein the silicone fluid is methylphenyl silicone fluid,
    wherein the ceramic power is consisted of quartz, monzonite, strontium, and vanadium,
    wherein, with respect to 100 parts by weight of the inorganic binding agent, the nonstick ceramic coating composite consists of
        12 parts by weight of the functional filler,
        20 parts by weight of the ceramic powder, and
        10 parts by weight of the pigment.

* * * * *